(12) United States Patent
Zeissner et al.

(10) Patent No.: US 10,514,077 B2
(45) Date of Patent: Dec. 24, 2019

(54) VIBRATION DAMPER WITH AN EXTERNAL HOUSING

(71) Applicant: ZF Friedrichshafen AG

(72) Inventors: Bernd Zeissner, Volkach (DE); Stefan Schmitt, Gochshelm (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 15 days.

(21) Appl. No.: 15/574,652

(22) PCT Filed: Apr. 18, 2016

(86) PCT No.: PCT/EP2016/058477
§ 371 (c)(1),
(2) Date: Nov. 16, 2017

(87) PCT Pub. No.: WO2016/184623
PCT Pub. Date: Nov. 24, 2016

(65) Prior Publication Data
US 2018/0128339 A1 May 10, 2018

(30) Foreign Application Priority Data
May 20, 2015 (DE) .................. 10 2015 209 178

(51) Int. Cl.
*B60G 17/08* (2006.01)
*F16F 9/32* (2006.01)

(52) U.S. Cl.
CPC .................... *F16F 9/325* (2013.01)

(58) Field of Classification Search
CPC .... F16F 9/062; F16F 9/065; F16F 9/44; F16F 9/466; B60G 17/021; B60G 17/08
USPC ............. 188/266.6, 298, 322.13, 322.2
See application file for complete search history.

(56) References Cited

U.S. PATENT DOCUMENTS

| | | | |
|---|---|---|---|
| 4,960,188 A | 10/1990 | Woessner | |
| 5,375,683 A * | 12/1994 | Huang | F16F 9/096 188/266.6 |
| 5,586,627 A * | 12/1996 | Nezu | B60G 17/08 188/266.6 |
| 5,649,611 A * | 7/1997 | Nakadate | B60G 17/08 188/266.6 |
| 5,988,332 A * | 11/1999 | Marzocchi | B60G 17/021 188/298 |
| 6,105,740 A * | 8/2000 | Marzocchi | B60G 17/021 188/298 |
| 6,321,888 B1 * | 11/2001 | Reybrouck | F16F 9/325 188/299.1 |

(Continued)

FOREIGN PATENT DOCUMENTS

| | | |
|---|---|---|
| DE | 3831718 | 3/1990 |
| DE | 4216987 | 7/1993 |
| DE | 4445705 | 6/1996 |

(Continued)

*Primary Examiner* — Christopher P Schwartz
(74) *Attorney, Agent, or Firm* — Cozen O'Connor

(57) ABSTRACT

Vibration damper (1) with an external housing (9) includes an outer cylinder (3) with a main axis. The housing (9) having two receiving spaces (13, 15) is arranged on an outer lateral surface of the outer cylinder (3). Each receiving space (13, 15) has a main axis. The main axis of the outer cylinder (3) and the main axes of the receiving spaces (13, 15) are arranged so as to be skew with respect to one another.

6 Claims, 9 Drawing Sheets

(56) References Cited

U.S. PATENT DOCUMENTS 8,322,499 B2 * 12/2012 Schmidt .................. F16F 9/466
                                                                                          188/267
9,863,494 B2 * 1/2018 Yu ........................... F16F 9/062

FOREIGN PATENT DOCUMENTS

| DE | 19527851 | 6/1996 |
| JP | 2010121687 | 6/2010 |

\* cited by examiner

C-C

VIBRATION DAMPER WITH AN EXTERNAL HOUSING

PRIORITY CLAIM

This is a U.S. national stage of application No. PCT/EP2016/058477, filed on Apr. 18, 2016. Priority is claimed on the following application: Country: Germany, Application No.: 10 2015 209 178.3, filed: May 20, 2015, the content of which is incorporated herein by reference in its entirety.

FIELD OF THE INVENTION

The present invention is directed to a vibration damper including a housing having two receiving spaces.

BACKGROUND OF THE INVENTION

A vibration damper with an external damping valve device having two separate damping valves is known from U.S. Pat. No. 4,960,188, in which the main axis of the two separate damping valves intersects a longitudinal axis of the vibration damper in each instance.

DE 42 16 987 A1 describes another common type of construction in which an external damping valve device in a paraxial housing is fastened to a vibration damper. The adjustable damping valves have a common main axis which extends parallel to the longitudinal axis of the vibration damper.

Both types of construction have basic advantages and disadvantages, and both types of construction are accordingly used depending upon application. However, both types of construction have in common that the installation space required for application in a vehicle is not optimal. Axle parts, the brake system and the shape of the inner fender also limit the installation space for the vibration damper with an external housing.

It is an object of the present invention to implement a vibration damper with an external housing having a reduced installation space requirement.

SUMMARY OF THE INVENTION

This object is met in that the main axis of the outer cylinder and the main axes of the receiving spaces are arranged so as to be skew with respect to one another.

"Skew" is to be understood in its mathematical definition, i.e., the main axis of the outer cylinder does not intersect any of the main axes of the receiving spaces and also does not extend parallel to the main axes of the receiving spaces. With this specific orientation of the receiving spaces, the housing lies more snugly against the outer cylinder if required or can extend into small partial installation spaces, e.g., in an inner fender, which would not be possible with a conventional orientation and construction of the housing.

In one embodiment, the main axes of the receiving spaces are arranged so as to be offset parallel to one another. In this way, the receiving spaces can be arranged closer to one another in direction of the main axes.

In a further advantageous configuration, the main axes of the receiving spaces lie in a common plane which runs parallel to the main axis of the outer cylinder. This step also serves to reduce the distance between the receiving spaces, since the cross section of the outer cylinder determines the spacing between the receiving spaces only to a very limited extent.

Installation space analyses have shown that the housing can be configured in a particularly compact manner when the main axes of the receiving spaces extend at an inclination to the main axis of the outer cylinder.

The same is true when the main axes of the receiving spaces intersect one another. Accordingly, the housing is basically arrow-shaped.

In principle, it is also possible that the main axes of the receiving spaces intersect one another within a cross-sectional plane of the outer cylinder.

For the purpose of facilitating mounting of the housing at the outer cylinder, it is provided that the housing is constructed in a point-symmetrical manner with respect to the arrangement of the receiving spaces and connection elements at the outer cylinder. Therefore, it is no longer necessary to be mindful of a particular angular position when mounting.

The housing advantageously has a fastening flange with fastening apertures for fixing to the outer cylinder. The flange lies outside of the receiving spaces so that the receiving spaces can be completely outfitted, e.g., with an adjustable damping valve, before the housing is mounted.

To facilitate production, the receiving spaces are connected to a connection opening of the outer cylinder via a connection channel, and a longitudinal axis of the connection channel has the same angular orientation as the receiving space. The connection channel can easily be incorporated via the receiving space by machining or casting, which would be appreciably more difficult with an angled connection channel.

BRIEF DESCRIPTION OF THE DRAWINGS

The invention is described in more detail below with reference to the drawings, in which.

DETAILED DESCRIPTION OF THE PRESENTLY PREFERRED EMBODIMENTS

Figure 1:
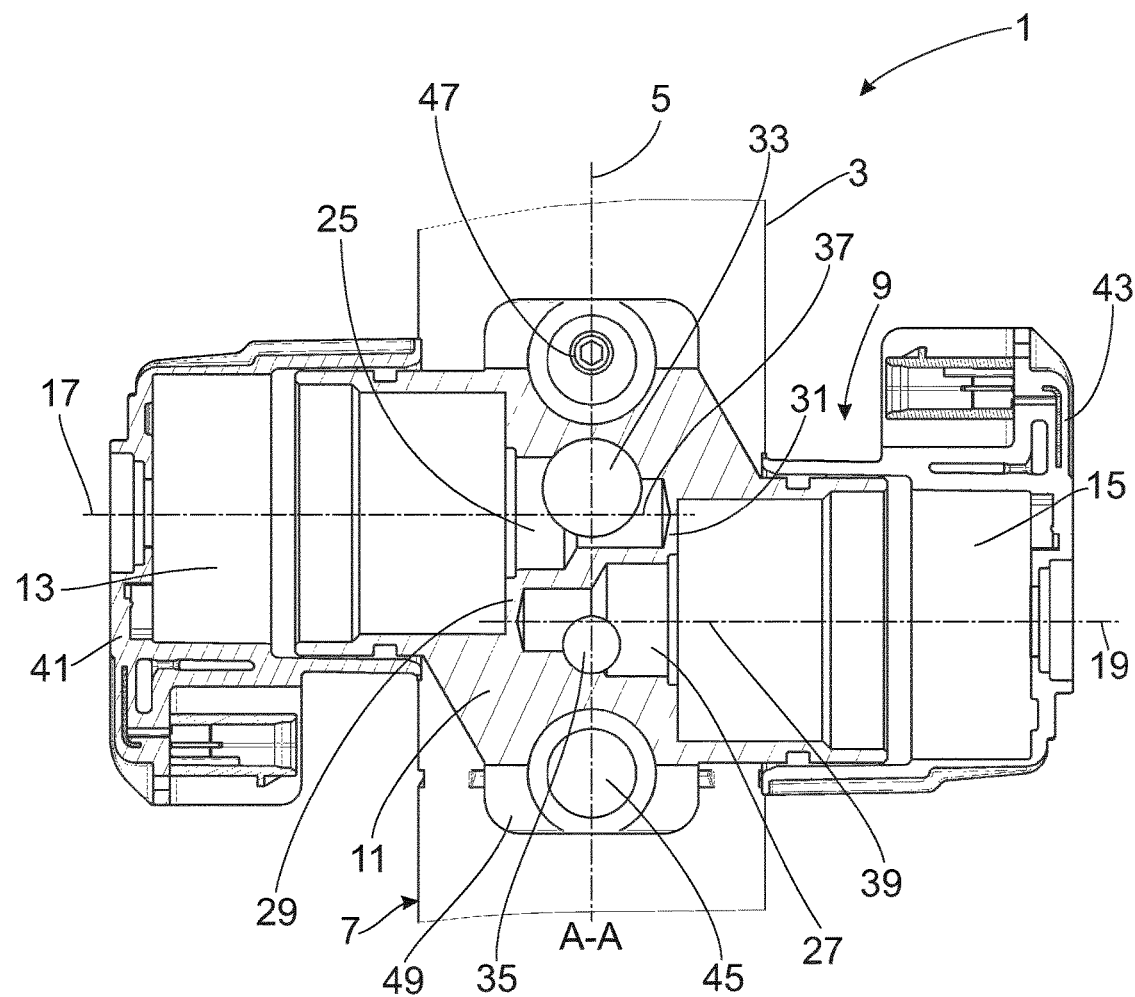
FIG. 1 is a cross-sectional view showing the housing with receiving spaces having main axes which are configured to be offset with respect to one another in accordance with the invention.

FIG. 1 shows a section from a selected vibration damper 1 with an outer cylinder 3 having a main axis 5 that is coextensive with the longitudinal axis of the outside cylinder. A housing 9 is arranged on an outer lateral surface 7 of the outer cylinder 3. Housing 9 has a one-part base body 11 with at least two receiving spaces 13; 15. Diverse subassemblies of the vibration damper 1 can be arranged in the receiving spaces 13; 15, e.g., an adjustable damping valve, a pump unit or a storage, although this list is merely exemplary and is not to be understood as limiting in any way.

Each of the two receiving spaces 13; 15 has a main axis 17; 19, respectively. The main axis 17; 19 is preferably coextensive with a center axis of the circular cross section of the receiving space 13; 15.

Figure 2:
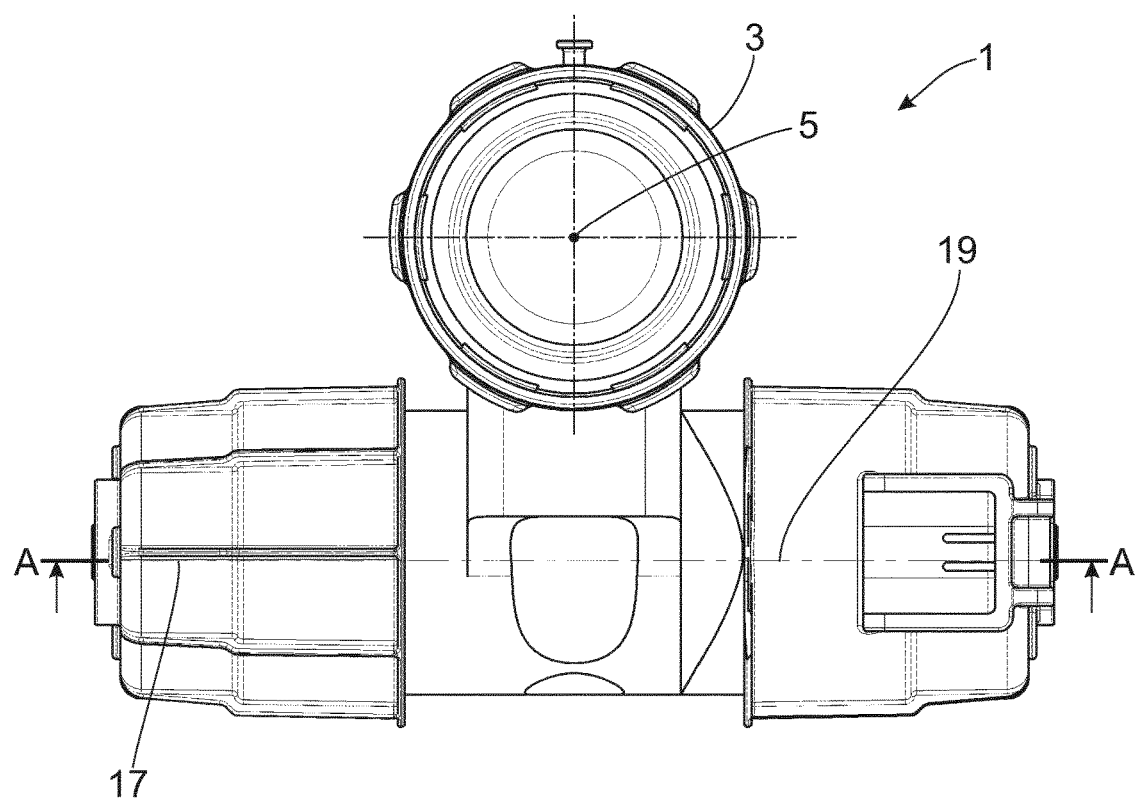
FIG. 2 is a top view showing the housing with receiving spaces having main axes which are configured to be offset with respect to one another in accordance with the invention
Figure 3:
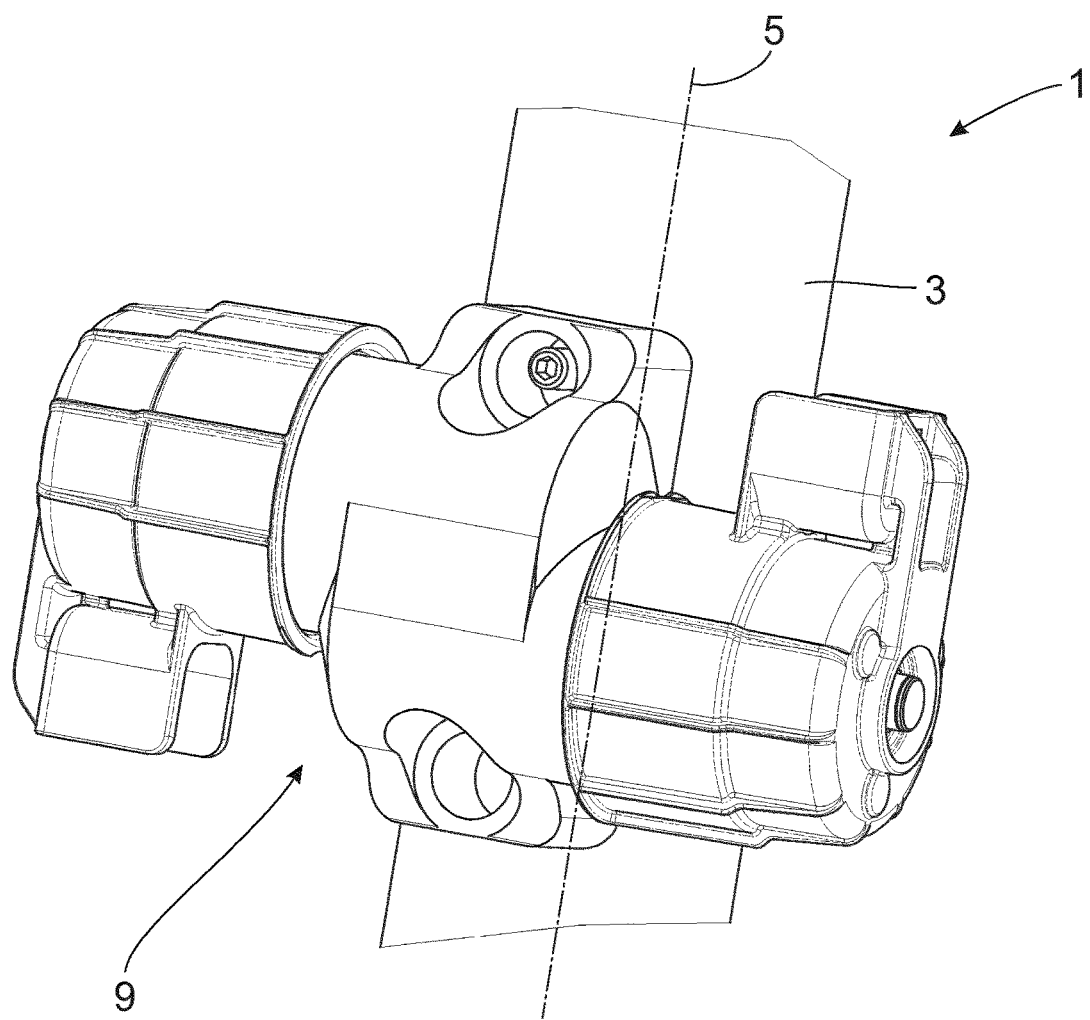
FIG. 3 is a side view showing the housing with receiving spaces having main axes which are configured to be offset with respect to one another in accordance with the invention

When FIGS. 1 to 3 are viewed in conjunction, it can be seen that the housing 9 is fastened eccentrically to the outer cylinder 3. Further, the main axes 17; 19 of the receiving spaces 13; 15 extend at right angles to the main axis 5 of the outer cylinder 3. Consequently, the main axes 17; 19 of the receiving spaces 13; 15 are arranged to be skew with respect to the main axis 5 of the outer cylinder 3, i.e., main axes 17; 19 of the receiving spaces do not intersect the main axis 5 of the outer cylinder 3, but also do not run parallel to, or even coextensive with, the main axis of outer cylinder 3.

The main axes 17; 19 of receiving spaces 13; 15 are arranged parallel to one another in an offset manner, see FIG. 1. Accordingly, at least connection channels 25; 27 which connect a base 29; 31 of a receiving space 13; 15 to a connection opening 33; 35 in the outer cylinder 3 in each instance can be configured to be laterally offset with an overlap. Accordingly, the housing 9 can be shortened axially compared with a construction in which the main axes 17; 19 of the receiving spaces are coextensive. The connection channels 25; 27 have the same angular orientation as the respective connected receiving space 13; 15 so that longitudinal axes 37; 39 of the connection channels 25; 27 have the same angular orientation as the main axes 17; 19 of the receiving spaces 13; 15. A tool can be inserted into the receiving space 13; 15 via an open end of the receiving spaces 13; 15 that is closed in each instance by a cover 41; 43 in FIGS. 1 to 3 in order to machine, e.g., drill out, the connection channel 25; 27 to the required dimensional stability.

FIG. 2 shows that the main axes 17; 19 of the working spaces lie in a common plane which extends parallel to the main axis 5 of the outer cylinder 3. FIGS. 1 and 3 further disclose that the arrangement of the receiving spaces 13; 15 in the housing 9 and of connection elements 45; 47 in a fastening flange are configured point-symmetrically with respect to the outer cylinder 3. Accordingly, housing 9 can also be fastened to the outer cylinder 3 so as to be rotated by 180° via a plurality of fastening apertures in the fastening flange of the housing.

Figure 4:
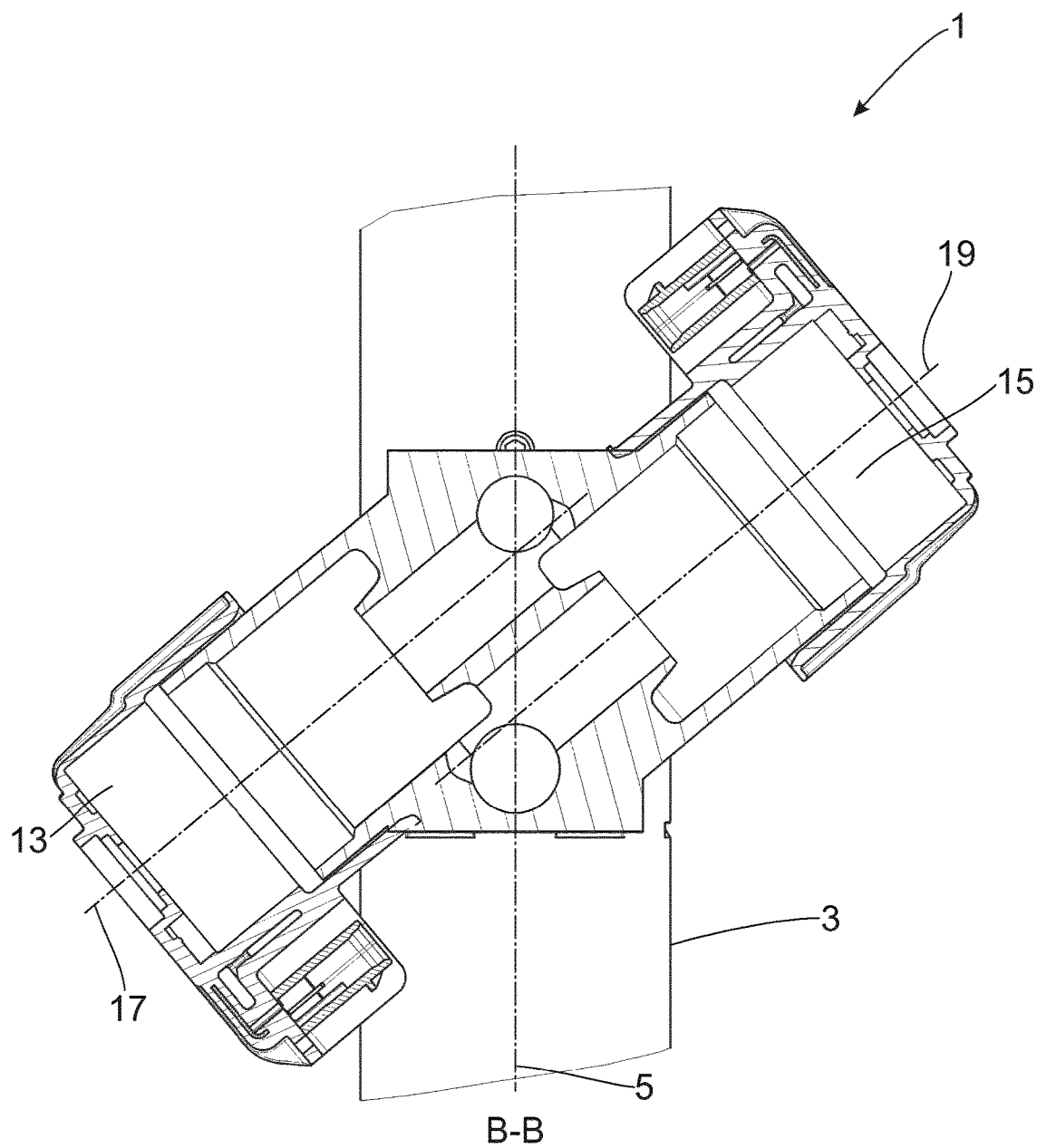
FIG. 4 is a cross-sectional view showing the housing with receiving spaces having main axes which extend at an inclination to the main axis of the vibration damper in accordance with the invention.
Figure 5:
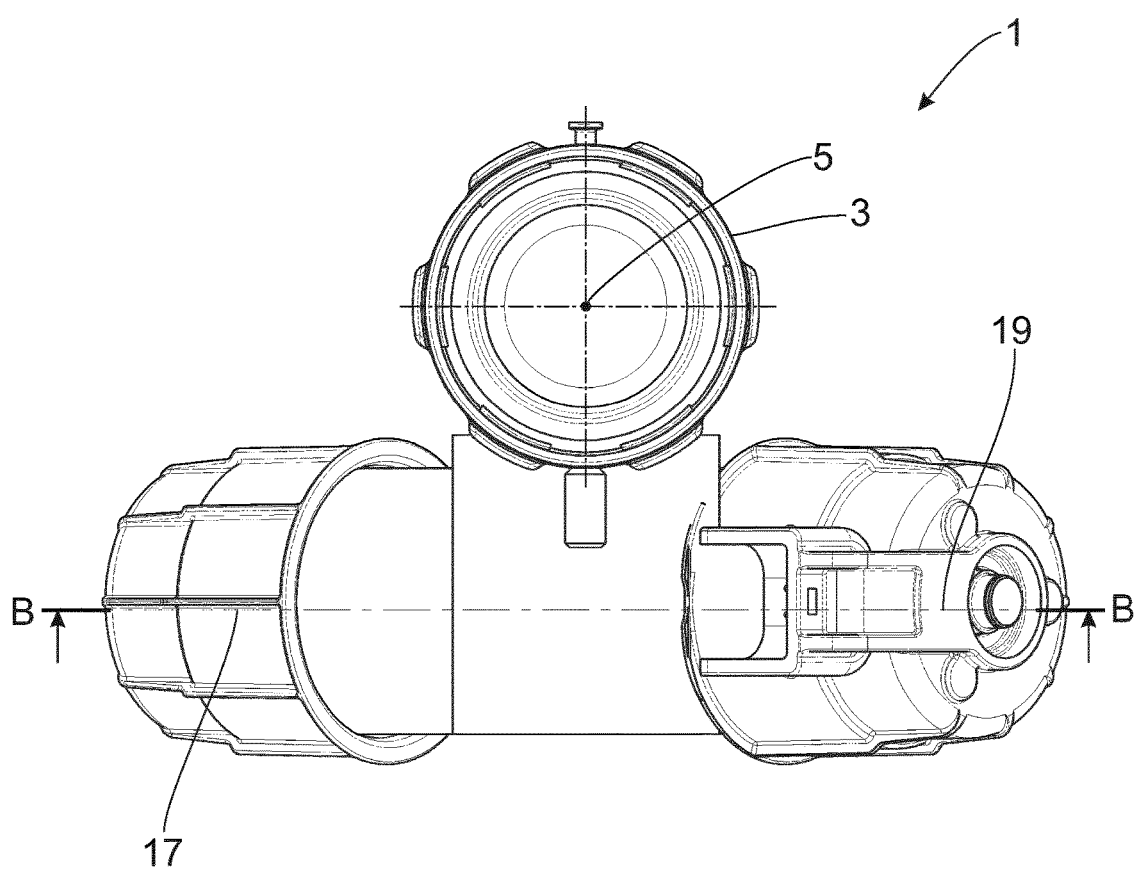
FIG. 5 is a top view showing the housing with receiving spaces having main axes which extend at an inclination to the main axis of the vibration damper in accordance with the invention.
Figure 6:
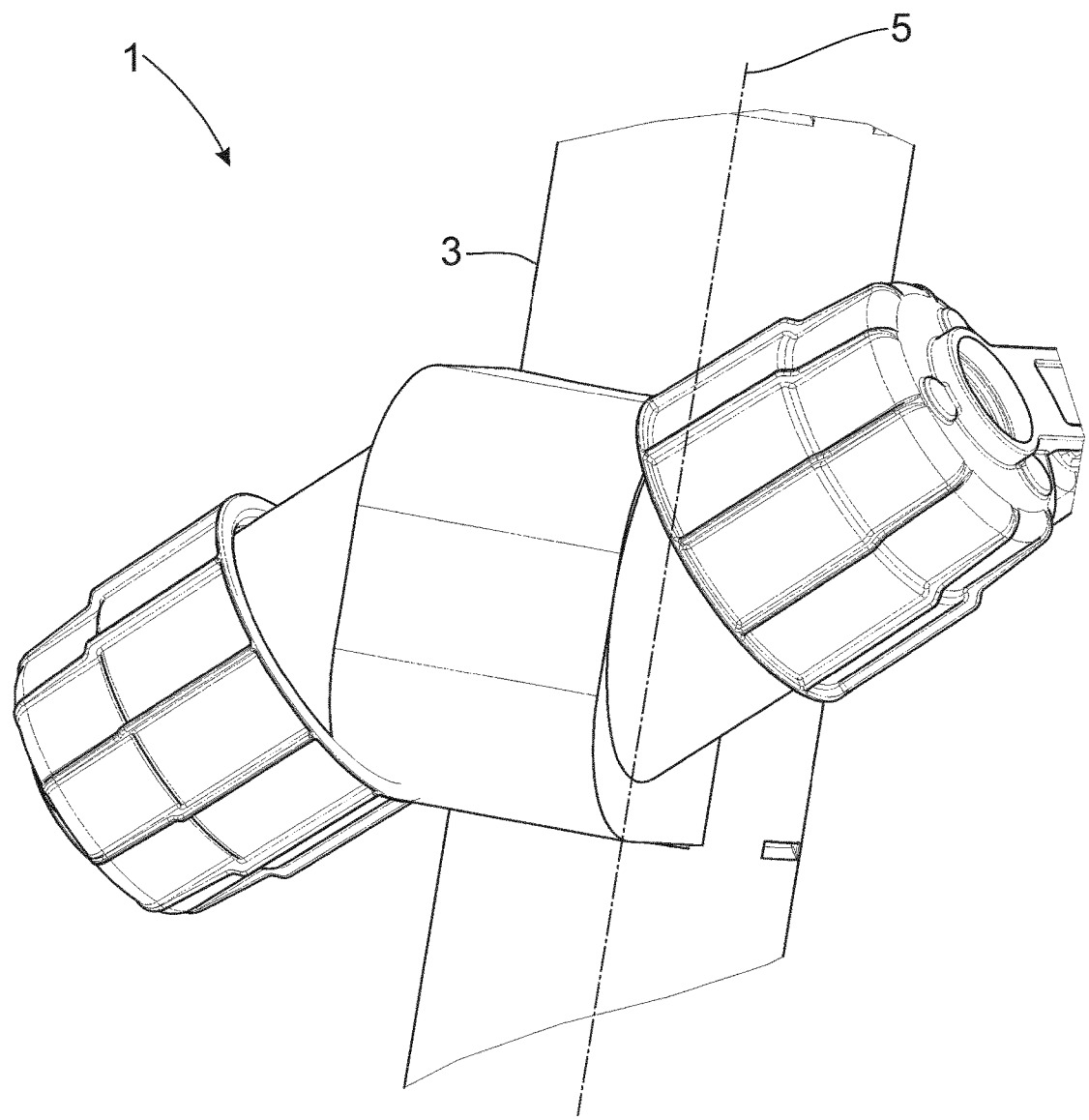
FIG. 6 is a side view showing the housing with spaces having main axes which extend at an inclination to the main axis of the vibration damper in accordance with the invention.
Figure 7:
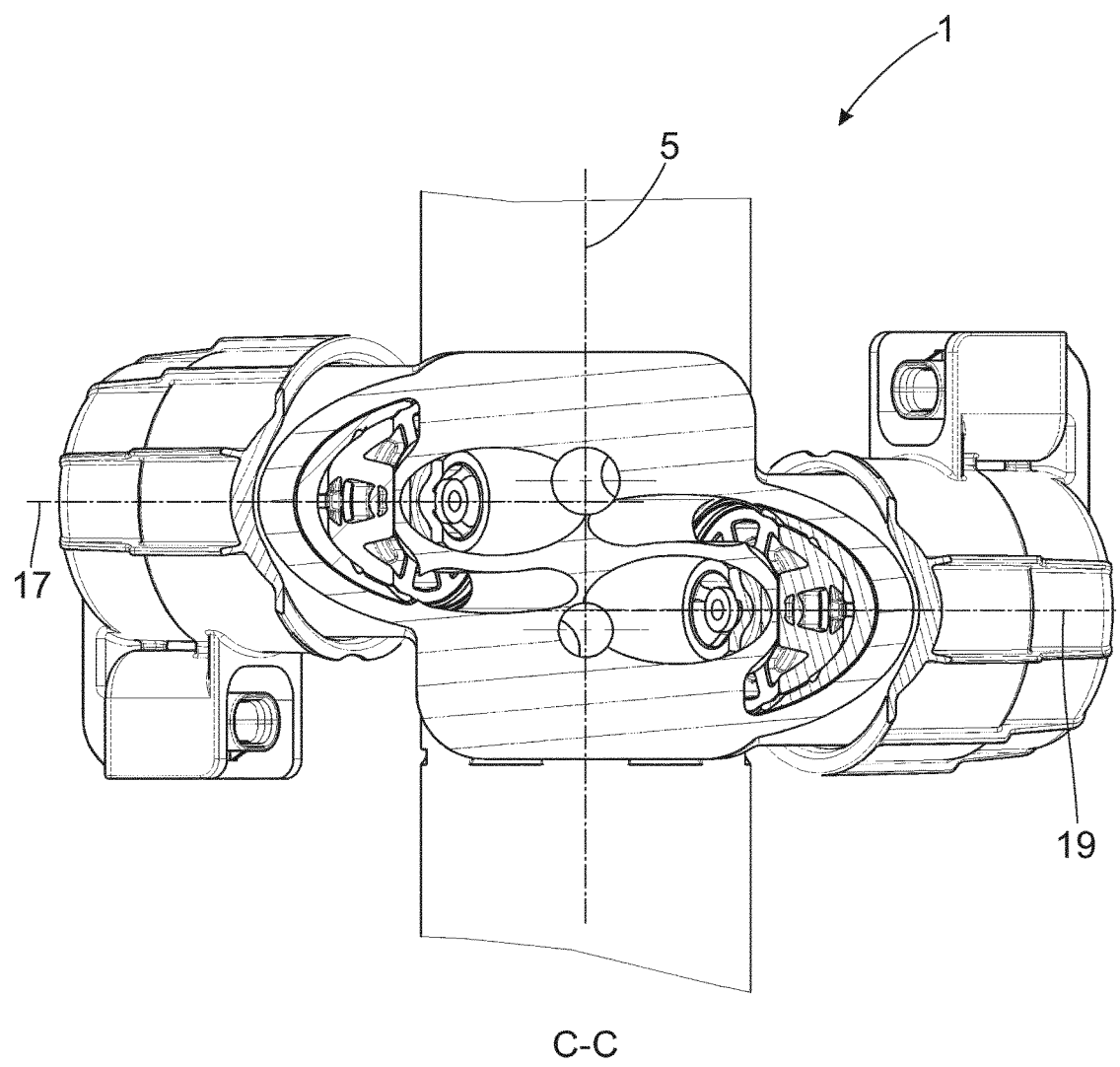
FIG. 7 is a partial cross-sectional view showing the housing with receiving spaces having main axes which intersect one another in accordance with the invention.

The group of FIGS. 4 to 6 has the same features as the group of FIGS. 1 to 3. In addition, FIGS. 4 to 6 are meant to show that the main axes 17; 19 of receiving spaces 13; 15 can also extend at an inclination to the main axis 5 of the outer cylinder 3. Particularly with receiving spaces 13; 15 having a small cross-sectional area, this type of construction requires an even smaller radial installation space than the construction according to FIGS. 1 to 3.

Figure 8:
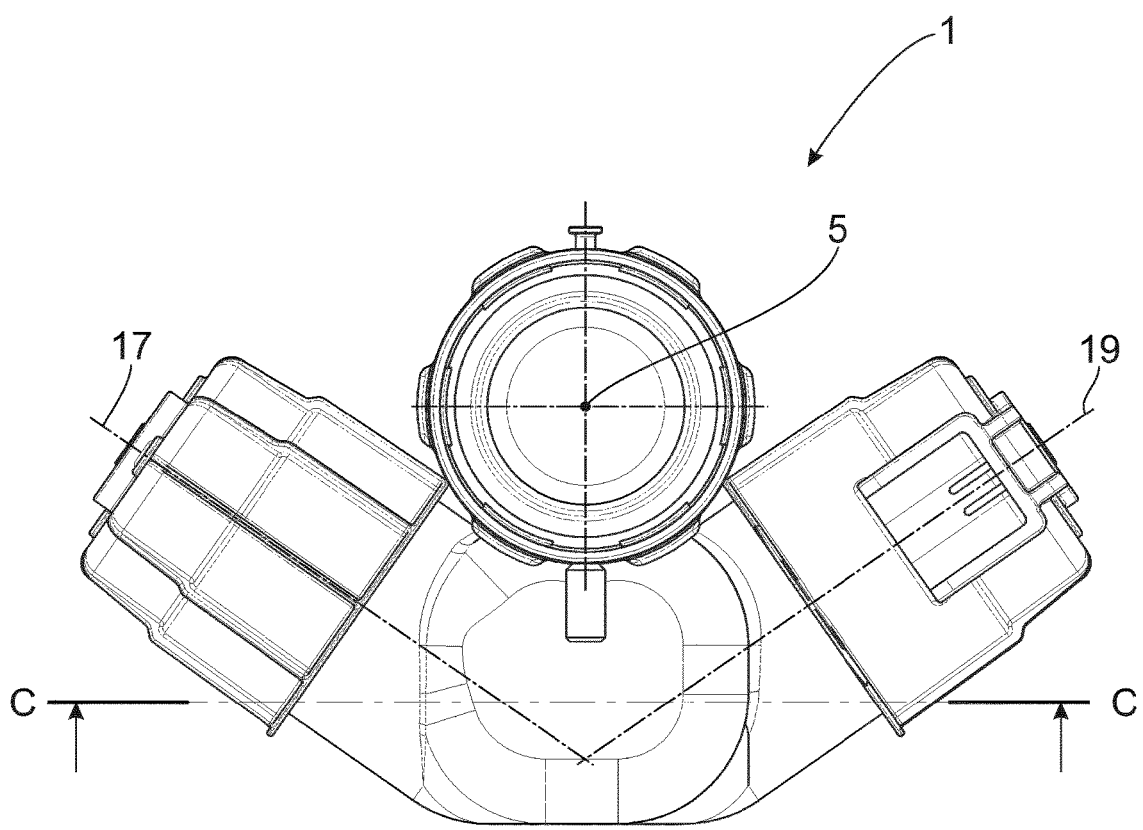
FIG. 8 is a top view showing the housing with receiving spaces having main axes which intersect one another in accordance with the invention.
Figure 9:
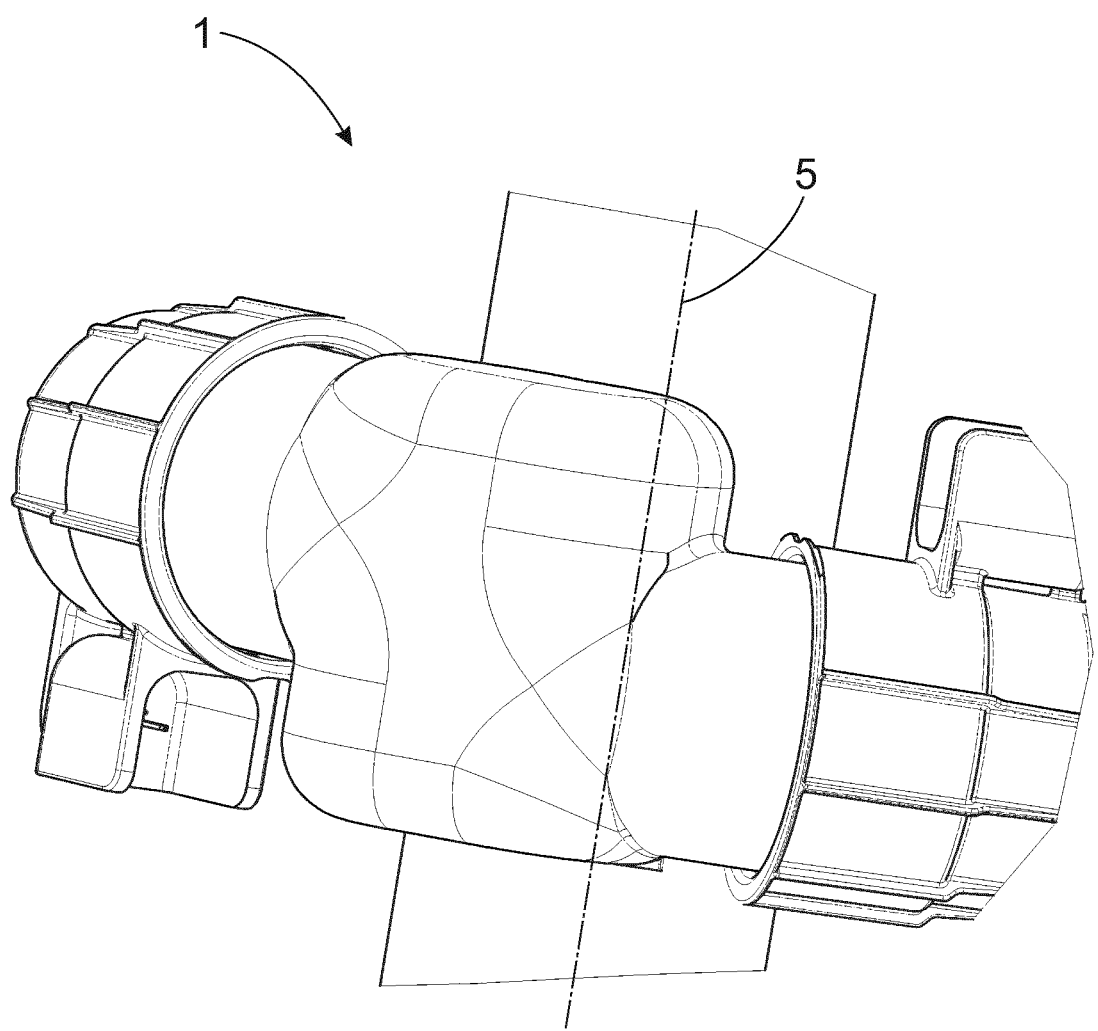
FIG. 9 is a side view showing the housing with receiving spaces having main axes which intersect one another in accordance with the invention.

Similar considerations also led to the orientation of the receiving spaces shown in FIGS. group 7 to 9. In these types of construction, the main axes 17; 19 of the receiving spaces can intersect one another, but do not intersect the main axis 5 of the outer cylinder 3. In a manner comparable to the embodiment according to FIGS. 1 to 3, the main axes 17; 19 of the receiving spaces 13; 15 extend at right angles to the main axis 5 of the outer cylinder 3 and are offset in parallel. The main axes 17; 19 of the receiving spaces 13; 15 can intersect within a cross-sectional plane of the outer cylinder as is shown in FIG. 8.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A vibration damper comprising:
an outer cylinder having a main axis;
a housing comprising two separate receiving spaces each having a circular cross section and arranged on an outer lateral surface of said outer cylinder, each of said receiving spaces having a main axis coextensive with a center axis of the circular cross section of the receiving spaces, wherein said main axis of said outer cylinder and said main axes of said receiving spaces are arranged so as to be skew with respect to one another; and wherein said main axes of said receiving spaces are arranged so as to be offset parallel to one another permitting to shorten the housing axially.

2. The vibration damper according to claim 1, wherein said main axes of said receiving spaces lie in a common plane running parallel to said main axis of said outer cylinder.

3. The vibration damper according to claim 1, wherein said main axes of said receiving spaces extend at an inclination to said main axis of said outer cylinder.

4. The vibration damper according to claim 1, additionally comprising connection elements at said outer cylinder, and wherein said housing is constructed in a point-symmetrical manner with respect to the arrangement of said receiving spaces and said connection elements.

5. The vibration damper according to claim 1, wherein said vibration damper housing comprises a fastening flange for fixing said damper housing to said outer cylinder.

6. The vibration damper according to claim 1, wherein each of said receiving spaces comprises a connection channel and a connecting opening to said outer cylinder; said connecting opening having a longitudinal axis; and wherein said longitudinal axis of said connection channel has the same angular orientation as the main axes of said receiving spaces.

* * * * *